United States Patent [19]

Lutz et al.

[11] 4,142,761

[45] Mar. 6, 1979

[54] VEHICLE ROOFS

[75] Inventors: Alfons Lutz, Emmering; Hans Jardin, Inning; Horst Bienert, Gauting; Georg Kohlpaintner, Munich, all of Fed. Rep. of Germany

[73] Assignee: Webasto Werk W. Baier GmbH & Co., Fed. Rep. of Germany

[21] Appl. No.: 849,647

[22] Filed: Nov. 8, 1977

[30] Foreign Application Priority Data

Mar. 9, 1977 [DE] Fed. Rep. of Germany ....... 2710193

[51] Int. Cl.² .............................................. B60J 7/00
[52] U.S. Cl. ................................. 296/137 B; 49/324; 49/465
[58] Field of Search .............. 296/137 B; 74/424.8 B; 49/463, 465, 324

[56] References Cited

U.S. PATENT DOCUMENTS

| 459,769 | 9/1891 | Russell | 74/424.8 B |
|---|---|---|---|
| 2,950,509 | 8/1960 | Stavanau | 49/324 |
| 3,955,848 | 5/1976 | Lutz | 296/137 B |
| 3,974,753 | 8/1976 | Blomgren | 296/137 B |
| 3,979,148 | 9/1976 | Martin | 296/137 B |

Primary Examiner—Robert R. Song
Attorney, Agent, or Firm—Craig & Antonelli

[57] ABSTRACT

A passenger body roof opening and detachable tiltable cover is provided. To accommodate tilting movement of the cover, a telescoping device is provided at the rear end thereof which is detachable attachable to the cover. The telescopic device includes a first threaded portion fixed to a body frame at the opening, a second threaded portion detachable connected directly to the cover, and at least one further threaded portion threadably engaging with the first and second threaded portions. To accommodate retraction of the telescopic jack when the cover member is detached from the second threaded portion, the second threaded portion is non-rotatably connected to the frame by way of a rectangular sleeve arrangement which permits telescoping axial movement of the threaded member, while preventing rotative movement.

13 Claims, 4 Drawing Figures

U.S. Patent  Mar. 6, 1979  Sheet 1 of 2  4,142,761
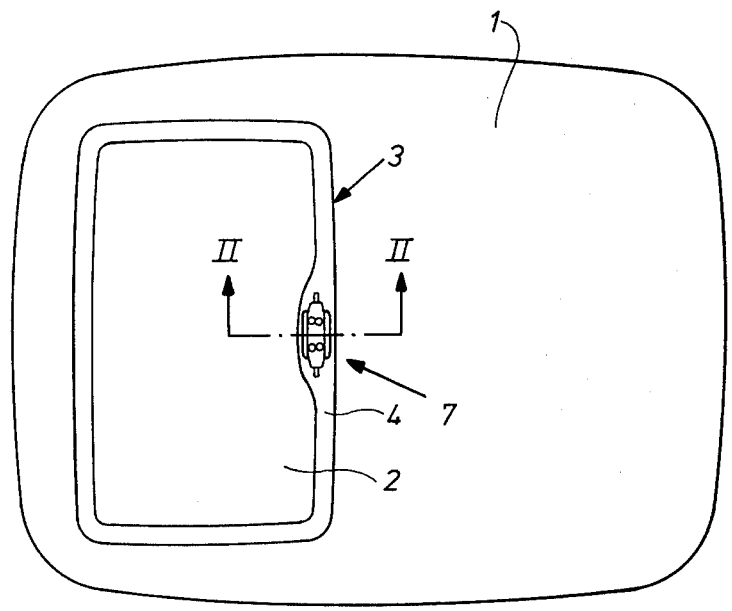
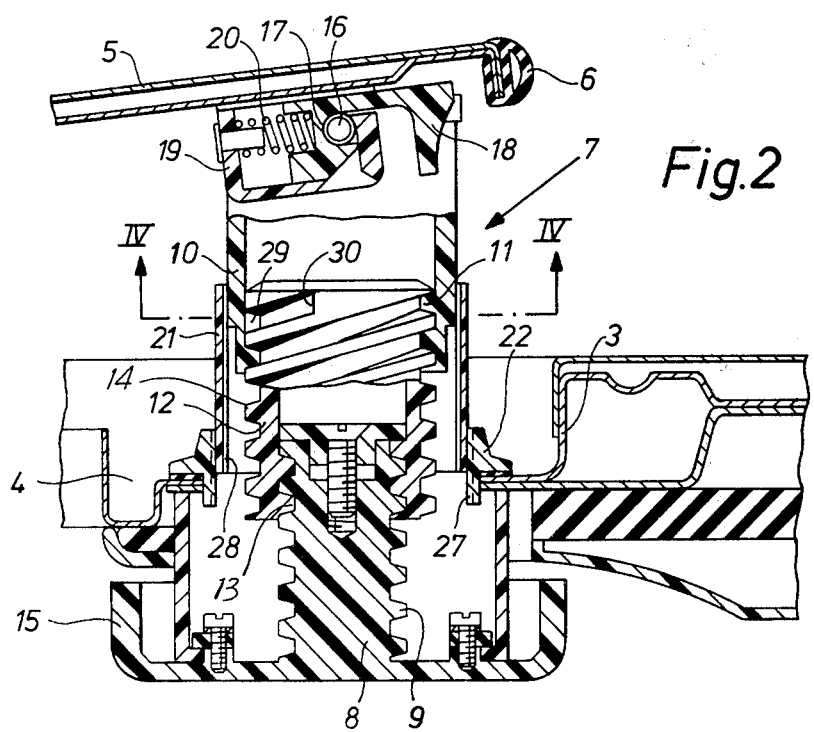

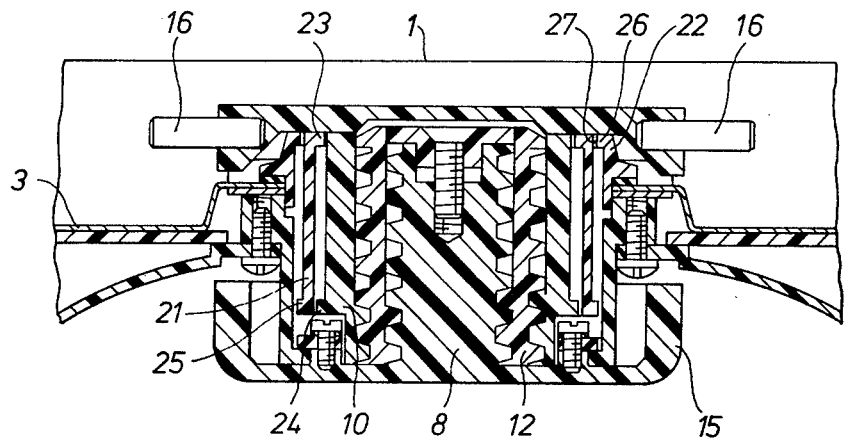
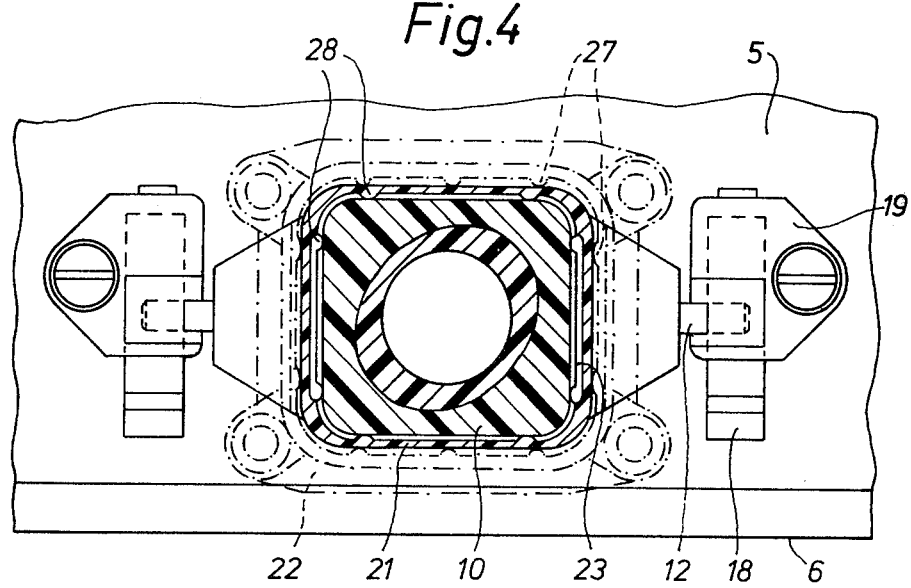

VEHICLE ROOFS

BACKGROUND AND SUMMARY OF THE INVENTION

The present invention relates to a vehicle roof with a cover arranged in a roof aperture, which is pivotable about an axis located in the neighborhood of its forward edge by means of a telescopic jack attached on the one hand to a roof frame surrounding the roof aperture and on the other hand to the cover itself, the telescopic jack comprising a first threaded portion arranged on the roof frame, a second threaded portion detachably fitted to the cover and at least one third threaded portion engaging with the first and second threaded portions.

A vehicle roof of this kind has been described in German Offenlegungsschrift No. 23 51 270.

In order, in the case of vehicle roofs of this kind, to be able to remove the cover, the latter must be pivoted out at least to a certain extent because the releasing of the cover from the telescopic jack should only be possible from the exterior of the vehicle in order to ensure that there is no possibility of the cover being inadvertently released from the interior whilst the vehicle is travelling because in that case the cover could fly off. With the cover removed, however, the telescopic jack is at least partially extended thereby impairing the appearance of the vehicle and giving rise to wind noise. The tendency, therefore, is for the user to try to retract the telescopic jack when the cover has been removed. However, this cannot easily be done because the second threaded portion which was attached to the cover rotates along with the first threaded portion when the latter is rotated, and therefore executes no axial displacement. It is therefore necessary to hold the second threaded portion with one hand whilst the other hand is used to rotate the first threaded portion so that the telescopic jack is retracted. The free rotation of the second threaded portion when the cover is removed is also a source of annoyance when the time comes to replace the cover because the second threaded portion then normally does not occupy the position in which it will engage in corresponding locking arrangements on the cover. It is therefore also necessary, in order to secure the cover in position, to suitably rotate the second threaded portion by hand so that the locking elements it carries are in the correct position to snap into engagement with the mating elements on the cover.

The present invention aims to overcome these drawbacks and so to improve the known vehicle roof that the telescopic jack can be retracted without any difficulty once the cover has been removed, whilst at the same time ensuring that without the need for any additional measures the second threaded portion engages in locking elements arranged on the cover, when the latter is placed back in position again. The present invention overcomes the above-noted problems by providing a non-rotatable connection between the second threaded portion and the roof frame.

In accordance with particularly preferred embodiments of the invention, there is provided a vehicle roof with a cover arranged in a roof aperture, which is pivotable about an axis located in the neighborhood of its forward edge by means of a telescopic jack attached on the one hand to a roof frame surrounding the roof aperture and on the other to the cover itself, the telescopic jack comprising a first threaded portion arranged on the roof frame, a second threaded portion detachably fixed to the cover and at least one third threaded portion engaging with the first and second threaded portions, wherein the second threaded portion is secured to the roof frame in such a fashion that it cannot rotate relatively thereto.

By means of the invention, the result is achieved that even with the cover removed, the second threaded portion does not rotate with the first threaded portion when the latter is rotated in order to retract the telescopic jack, but translates instead. On the other hand, because the second threaded portion is secured against rotation, it is ensured that the locking or latching elements provided on it are always in the position in which they will engage in the mating elements of the cover when the latter is replaced.

The non-rotational attachment between the second threaded portion and the roof frame is achieved in particularly preferred embodiments by virtue of the fact that the second threaded portion, which surrounds the third threaded portion, is itself surrounded by a sleeve which is attached on the one hand to the roof frame and on the other to the second threaded portion in such a manner as not to be rotatable in relation thereto, being nevertheless capable of axial displacement. When the telescopic jack is extended, this sleeve is carried along with the second threaded portion but secures it against rotation because it is appropriately assembled in the roof frame. The attachment between these two parts in order to provide security against rotation but nevertheless to allow axial displacement, can be achieved by known means, for example using a pin and slot arrangement. Preferably, however, the sleeve and the second threaded portion will have a non-circular internal and external contour respectively. The contours can be substantially rectangular with the major axis of the rectangle disposed transversely to the longitudinal axis of the vehicle roof in order to occupy as little space as possible along the longitudinal axis of the roof.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a schematic top view of one embodiment of a vehicle roof according to the invention with the cover removed;

FIG. 2 is a sectional view along line II—II of FIG. 1 on a larger scale, the telescopic jack being shown in the extended position and with the cover deployed;

FIG. 3 is a sectional view similar to that of FIG. 2 but with the telescopic jack retracted and the cover not in position; and FIG. 4 is a sectional view along line IV—IV of FIG. 2, showing a ring for guiding the sleeve in dot-dashed lines.

DETAILED DESCRIPTION OF THE DRAWINGS

As shown in FIG. 1, a vehicle roof 1 has a rectangular opening 2 surrounded by a roof frame 3 forming a rain gutter 4. The roof opening 2 is normally closed by a cover 5 (FIG. 2) which is pivotably attached at its forward edge to the roof frame 3 and can be deployed at its rear edge 6 by means of a telescopic jack 7. In order to be able to remove the cover 5 completely, the pivoting attachment between the forward edge thereof and the roof frame 3 is releasable and is designed for example as a plug-in arrangement for this purpose, with two lugs extending forward from the forward edge of the cover, which engage in corresponding slots in the vertical front wall of the roof frame 3 in the manner illustrated and described in principle in German Patent Specification No. 2,331,329. The telescopic jack 7 is also releasably attached to the cover 5 in a manner which will be described in more detail hereinafter.

The telescopic jack itself consists of a first threaded portion 8 with an external screw-thread 9, a second threaded portion 10 with an internal screw-thread 11 and a third threaded portion 12 with an internal screw-thread 13 and an external screw-thread 14, these latter engaging respectively with the external thread 9 of the threaded portion 8 and the internal thread 11 of the threaded portion 10. The first threaded portion 8 is assembled in the roof frame 3 in such a fashion that it is capable of rotation without axial displacement in roof frame 3 and has a handwheel 15 by rotation of which the telescopic jack 7 can be extended and retracted. The threads 9, 11, 13 will preferably be multiple threads in order to give the telescopic jack 7 the maximum possible extension travel for a relatively small rotation of the handwheel 15.

The threaded portion 10 is pivotally attached to the cover 5 and is held against rotation with respect thereto. To this end, the threaded portion 10 has two diametrically extending pins 16 which can engage in each case in a groove 17 in a manually operable locking latch 18 attached by a bearing housing 19 to the cover 5 and designed so that it can be pressed back against the load of a spring 20 in order to release the pins 16 and enable the cover 5 to be removed. The illustrated detachable connection between the cover 5 and the telescopic jack 7 has the advantage that the spring 20 at all times springloads the locking latch 18 against the locking pin 16 so that on the one hand the requisite displacement of the pin 16 relative to the cover 5 when the latter is deployed, is made possible, and on the other hand flapping noises are avoided.

In order, with the cover 5 removed, to prevent the second threaded portion 10 from rotating when the handwheel 15 is rotated and thus in order to enable the telescopic jack 7 to be retracted when the cover 5 is not in place, the external contour of the second threaded portion 10 takes the form of an elongated rectangle (see FIG. 4) and the threaded portion 10 is surrounded by a sleeve 21 having a corresponding internal contour and assembled in a four-cornered ring 22 attached to the roof frame 3 in such a fashion that it is held against rotation relative thereto but can be displaced axially. The sleeve 21 is entrained by the second threaded portion 10 when the telescopic jack 7 is extended, by virtue of the fact that the external rim of the sleeve 21 possesses a number of inwardly projecting extensions 23 (FIG. 3) which are engaged by corresponding stops 24 on the external surface of the threaded portion 10.

The outward motion of the sleeve 21 can be limited by outwardly projecting extensions 25 on the external rim of the sleeve 21, which are located at two opposite sides of said rim and can cooperate with corresponding stops 26 on the ring 22 in the manner shown in FIG. 3.

To reduce the friction between the sleeve 21 and the ring 22, longitudinal ribs 27 (FIG. 4) are provided on the internal surface of the ring 22. Corresponding longitudinal ribs 28 can be provided between the sleeve 21 and the threaded portion 10.

In order to reliably prevent the threads 9, 11, 13 from jamming in the fully extended position of the telescopic jack 7, it is advantageous to arrange that the thread turns do not terminate with sharp points in the normal way but terminate in a flat surface in the manner shown in FIG. 2 by the reference 29 in the case of the internal thread 11 of the second threaded portion 10, and by the reference 30 in the case of the external thread 14 of the third threaded portion 12.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Vehicle body apparatus comprising a vehicle body opening, a cover for closing said opening, a frame surrounding the opening, and a telescopic jack for raising and lowering one end of said cover; said telescopic jack including:
   a first threaded portion arranged on the frame,
   a second threaded portion detachably connected to the cover,
   at least one third threaded portion threadably engaging with the first and second threaded portions,
   and connecting means operatively interconnecting said second threaded member and said frame for securing said second threaded portion against rotational movement with respect to said frame while permitting axial movement of said second threaded portion with respect to said frame.

2. Apparatus according to claim 1, wherein said opening is a roof opening in a vehicle passenger compartment, and wherein said cover is pivotable about an axis located at the end thereof opposite said one end.

3. Apparatus according to claim 2, wherein said one end is the rear end of said cover.

4. Apparatus according to claim 1, wherein the second threaded portion is provided with an internal screw-thread engageable with an external screw-thread on the third threaded portion, and wherein the second threaded portion is surrounded by a sleeve which is attached to the frame in such a fashion as to be incapable of relative rotation thereto but capable of axial displacement.

5. Apparatus according to claim 4, wherein the sleeve and the second threaded portion have a non circular internal and external contour respectively.

6. Apparatus according to claim 5, wherein the said internal and external contours are substantially rectangular.

7. Apparatus according to claim 4, wherein guide surfaces are provided between the sleeve and frame and between the sleeve and the second threaded portion and wherein friction-reducing projections are provided on said guide surfaces.

8. Apparatus according to claim 3, wherein the second threaded portion has two laterally projecting locking pins extending transversely to the longitudinal axis of the vehicle roof and wherein locking latches are provided on the underside of the cover, said locking latches being releasable against spring tension and receiving the locking pins.

9. Apparatus according to claim 8, further including spring means serving to urge the locking latches into engagement with the locking pins.

10. Apparatus according to claim 3, wherein the second threaded portion is provided with an internal screw-thread engageable with an external screw-thread on the third threaded portion, and wherein the second threaded portion is surrounded by a sleeve which is attached to the frame in such a fashion as to be incapable of relative rotation thereto but capable of axial displacement.

11. Apparatus according to claim 10, wherein the sleeve and the second threaded portion have a non circular internal and external contour respectively.

12. Apparatus according to claim 11, wherein the said internal and external contours are substantially rectangular.

13. Apparatus according to claim 10, wherein guide surfaces are provided between the sleeve and frame and between the sleeve and the second threaded portion and wherein friction-reducing projections are provided on said guide surfaces.

* * * * *